United States Patent
Naito et al.

(10) Patent No.: US 9,431,179 B2
(45) Date of Patent: Aug. 30, 2016

(54) SOLID ELECTROLYTIC CAPACITOR MANUFACTURING METHOD

(71) Applicant: SHOWA DENKO K.K., Tokyo (JP)

(72) Inventors: Kazumi Naito, Tokyo (JP); Katsutoshi Tamura, Tokyo (JP); Masahiro Suzuki, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/425,947

(22) PCT Filed: Jul. 30, 2013

(86) PCT No.: PCT/JP2013/070601
§ 371 (c)(1),
(2) Date: Mar. 4, 2015

(87) PCT Pub. No.: WO2014/038316
PCT Pub. Date: Mar. 13, 2014

(65) Prior Publication Data
US 2015/0221444 A1    Aug. 6, 2015

(30) Foreign Application Priority Data
Sep. 5, 2012    (JP) ................. 2012-194876

(51) Int. Cl.
*H01G 9/10* (2006.01)
*H01G 9/012* (2006.01)
(Continued)

(52) U.S. Cl.
CPC .............. *H01G 9/10* (2013.01); *H01G 9/0029* (2013.01); *H01G 9/012* (2013.01); *H01G 9/15* (2013.01);
(Continued)

(58) Field of Classification Search
CPC ...... H01G 9/10; H01G 9/0029; H01G 9/012; H01G 9/15; B29C 45/14467; B29C 45/14639; B29C 2045/1454; B29L 2031/3406
USPC ........................................................ 29/25.03
See application file for complete search history.

(56) References Cited

U.S. PATENT DOCUMENTS

| | | | |
|---|---|---|---|
| 6,592,352 B1 | 7/2003 | Poinelli et al. | |
| 2006/0221557 A1* | 10/2006 | Ohtsu | H01G 9/012 361/540 |
| 2011/0096467 A1* | 4/2011 | Taketani | H01G 9/012 361/528 |

FOREIGN PATENT DOCUMENTS

| | | | |
|---|---|---|---|
| JP | 63-77338 U | 5/1988 | |
| JP | 2-137219 U | 11/1990 | |
| JP | 4-4734 U | 1/1992 | |
| JP | 4-357813 A | 12/1992 | |
| JP | 11-111907 A | 4/1999 | |
| JP | 3071115 B2 | 7/2000 | |

(Continued)

OTHER PUBLICATIONS

International Search Report of PCT/JP2013/070601, dated Aug. 27, 2013. [PCT/ISA/210].

*Primary Examiner* — Fernando L Toledo
*Assistant Examiner* — Adam S Bowen
(74) *Attorney, Agent, or Firm* — Sughrue Mion, PLLC

(57) ABSTRACT

A method of manufacturing a solid electrolytic capacitor chip, which includes mounting a solid electrolytic capacitor element on the front surface side of a cathode lead of a lead frame serving as a cathode terminal; electrically connecting an anode and a cathode of the solid electrolytic capacitor element respectively to an anode terminal and the cathode terminal of the lead frame; and injecting an exterior resin from a resin injection port of a mold by transfer molding so as to seal the solid electrolytic capacitor element with the exterior resin. The resin injection port is located such that the exterior resin injected from the injection port branches and flows toward both the front surface side and the rear surface side and of the lead frame.

7 Claims, 2 Drawing Sheets

(51) Int. Cl.
*H01G 9/15* (2006.01)
*H01G 9/00* (2006.01)
*B29C 45/14* (2006.01)
*B29L 31/34* (2006.01)

(52) U.S. Cl.
CPC .... *B29C 45/14467* (2013.01); *B29C 45/14639* (2013.01); *B29C 2045/1454* (2013.01); *B29L 2031/3406* (2013.01); *Y10T 29/417* (2015.01)

(56) References Cited

FOREIGN PATENT DOCUMENTS

| | | |
|---|---|---|
| JP | 2001-47473 A | 2/2001 |
| JP | 2003-197485 A | 7/2003 |
| JP | 2007-36092 A | 2/2007 |
| JP | 2012-54434 A | 3/2012 |

* cited by examiner

FIG. 1
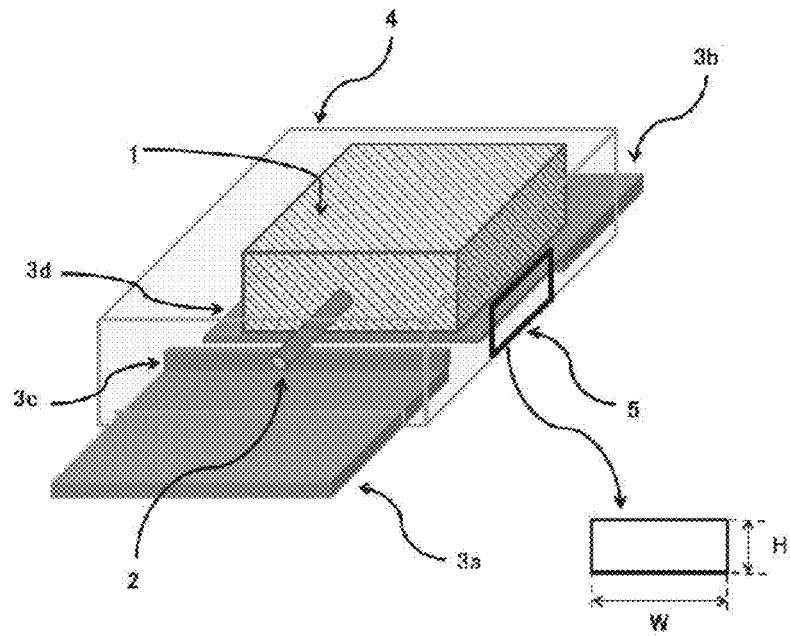
FIG. 2(A)
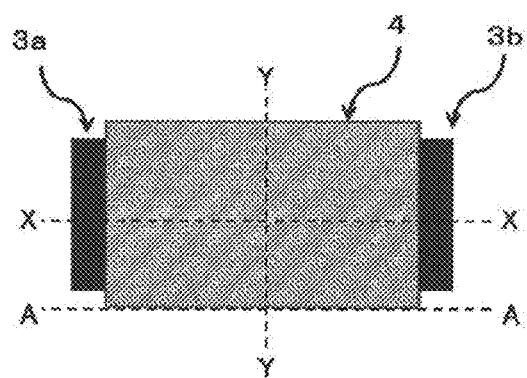
FIG. 2(B)　　FIG. 2(C)
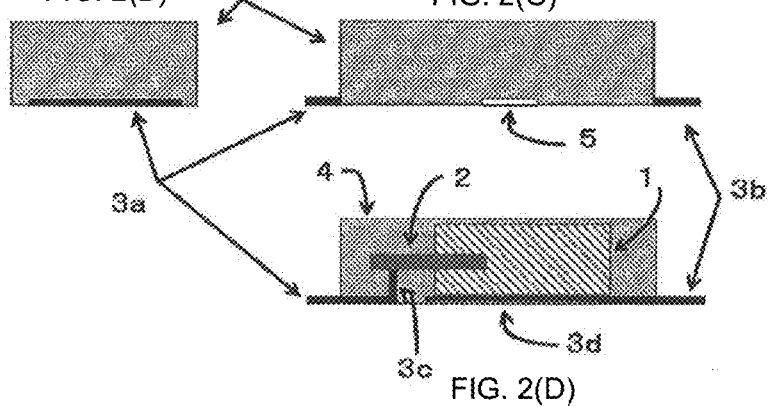
FIG. 2(D)

FIG. 3(A)
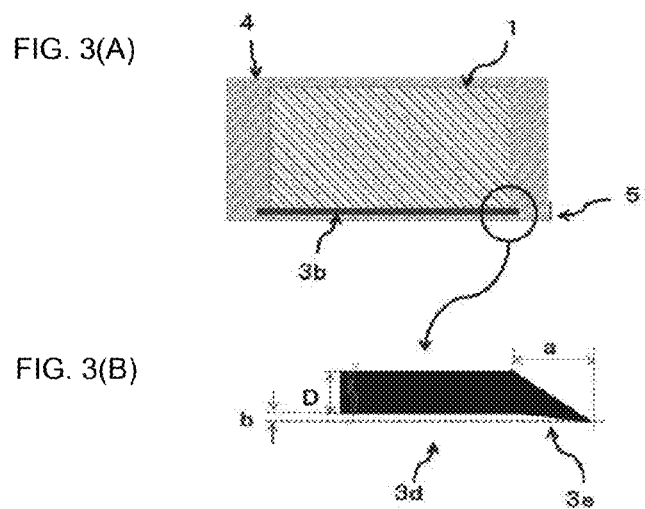
FIG. 3(B)
FIG. 4
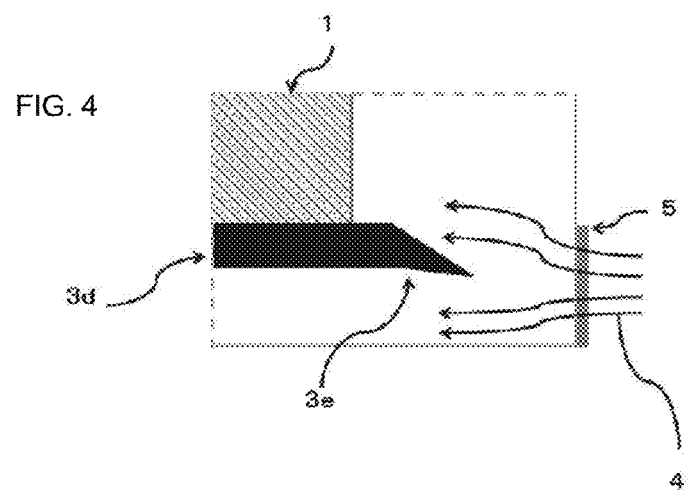
FIG. 5(A)
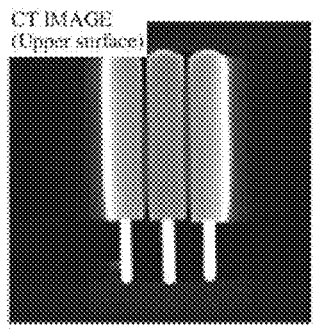
FIG. 5(B)
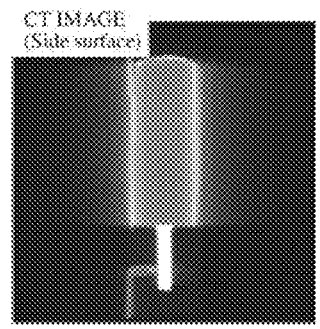

SOLID ELECTROLYTIC CAPACITOR MANUFACTURING METHOD

CROSS REFERENCE TO RELATED APPLICATIONS

This application is a National Stage of International Application No. PCT/JP2013/070601 filed Jul. 30, 2013, claiming priority based on Japanese Patent Application No. 2012-194876, filed Sep. 5, 2012, the contents of all of which are incorporated herein by reference in their entirety.

TECHNICAL FIELD

The present invention relates to a method of manufacturing a solid electrolytic capacitor, the method involving sealing a solid capacitor element with resin in a mold. More specifically, the present invention relates to a method of injecting resin into a mold when sealing a capacitor element with resin in a mold through use of a transfer machine.

BACKGROUND ART

As one of capacitors having high capacity to be used for various electronic devices, there is given a solid electrolytic capacitor chip in which a solid electrolytic capacitor element comprises a dielectric oxide film, a semiconductor layer, and an electrode layer laminated sequentially on a rectangular parallelepiped sintered body of conductive powder having an anode lead planted on one surface thereof, and the solid electrolytic capacitor element is sealed with an exterior resin.

The solid electrolytic capacitor is manufactured by sealing a solid electrolytic capacitor element with a molding resin, the solid electrolytic capacitor element being composed of a sintered body (conductor) of conductive powder such as tantalum having fine pores, which serves as one electrode (anode), a dielectric layer formed on a surface layer of the electrode, the other electrode (in general, a cathode formed of a semiconductor layer) formed on the dielectric layer, and an electrode layer laminated on the other electrode. In a conductor of the same volume, the surface area in the conductor increases as each pore becomes smaller and the amount of pores becomes larger, and hence the capacity of a capacitor manufactured from the conductor becomes larger. In general, a sintered body having a high CV and a large volume has fine pores that have a long depth, and thus has a low filling rate of a semiconductor layer. The sintered body having a large number of pores not filled with a semiconductor has low strength, and a dielectric film thereof is easily degraded due to a stress. In particular, there is a problem in that the yield of the manufactured solid electrolytic capacitor degrades due to an increase in leakage current when the injection stress of resin displaces a solid electrolytic capacitor element from a position on a lead frame at which the solid electrolytic capacitor element has been mounted (horizontal abnormality), or an outer appearance defect occurs in such a way that minute holes (pin holes) not filled with resin are formed in a resin exterior body of a manufactured solid electrolytic capacitor.

The solid electrolytic capacitor element is sealed with resin through use of a transfer machine, for example, by disposing a lead frame having the solid electrolytic capacitor element mounted thereon in a mold and injecting resin from a resin injection port of the mold.

As a method of manufacturing a capacitor by transfer molding, JP 3071115 B2 (Patent Document 1), there is discloses a method involving mounting a buffer (such as synthetic resin, rubber and paper) onto a surface of a capacitor element facing a gate of a mold so as to diminish the injection pressure of an injection resin for molding. JP 04-357813 A (Patent Literature 2) discloses a method of reducing the leakage-current percent defective by providing a protective resin to a washer for preventing creep-up of a solid electrolyte on a side of the washer which faces a gate port of a mold, when a capacitor element having the washer is sealed with resin. Note that, none of these methods focuses on the arrangement of a mold gate (resin injection port) through which resin is injected at the time of sealing the capacitor element with resin through use of a transfer machine.

JP 2007-36092 A (Patent Document 3) discloses a method of providing a resin injection port of a mold at such a position that resin immediately after being injected (in an initial stage) is not brought into contact with a capacitor element (for example, in a gap between a cathode frame and an anode frame facing each other under an anode lead wire). However, in recent years, the dimensions of a sintered body have increased along with an increase in capacity of a capacitor, and hence the gap between the cathode frame and the anode frame becomes smaller than the injection port, which makes it difficult to locate the injection port at this position.

As an example, in a solid electrolytic capacitor chip having outer dimensions of 7.3×4.3×1.9 mm, the gap between a cathode frame and an anode frame is intended to fall within 1.0 mm. However, considering the flowability of an exterior resin and the outer diameter (generally, from about 0.01 to 0.09 mm) of a filler mixed in the resin, it is preferred that an injection port have dimensions of 1.2×0.1 mm or more, and thus it is difficult to locate the injection port at that position. Consequently, there is no choice but to locate the injection port at such a position that the exterior resin is brought into contact with a capacitor element during injection. In this case, there has been a problem that defective products are generated in which pin holes (minute holes not filled with the resin) are present in an exterior body after sealing with the resin, and an LC value is also out of a prescribed value.

PRIOR ART

Patent Documents

[Patent Document 1] JP 3071115 B2
[Patent Document 2] JP 04-357813 A
[Patent Document 3] JP 2007-36092 A

SUMMARY OF INVENTION

Problem to be Solved by the Invention

Thus, an object of the present invention is to provide a method of manufacturing a solid electrolytic capacitor which can lessen the occurrence of minute holes not filled with the resin in a resin exterior body in the case where a resin injection port of a mold is located at such a position that an exterior resin is brought into contact with a capacitor element when the capacitor element is sealed with the resin by transfer molding.

Means to Solve the Problem

That is, the present invention provides the following method of manufacturing a solid electrolytic capacitor.

[1] A method of manufacturing a solid electrolytic capacitor chip, comprising mounting a solid electrolytic capacitor element on one surface (front surface) of a cathode lead of a lead frame serving as a cathode terminal; electrically connecting an anode and a cathode of the solid electrolytic capacitor element respectively to an anode terminal and the cathode terminal of the lead frame; and injecting an exterior resin from a resin injection port of a mold by transfer molding so as to seal the solid electrolytic capacitor element with the exterior resin, in which the resin injection port is located at such a position that the exterior resin injected from the injection port branches and flows toward both the front surface side and the other surface (rear surface) side and of the lead frame.

[2] The method of manufacturing a solid electrolytic capacitor chip according to [1] above, in which the cathode lead comprises a portion that is exposed to the outside of a rear surface of the solid electrolytic capacitor chip so as to serve as a cathode when being sealed and a portion that is not exposed to the outside of the rear surface of the solid electrolytic capacitor chip when being sealed by being processed so as to have a smaller thickness by eliminating a part of a rear surface of the cathode lead in a direction from a tip end on the anode terminal side toward the cathode terminal.

[3] The method of manufacturing a solid electrolytic capacitor chip according to [1] or [2] above, in which the injection port is located at a position facing the cathode lead, and an opening of the injection port has a height larger than a thickness of a side end portion of the cathode lead facing the injection port.

[4] The method of manufacturing a solid electrolytic capacitor chip according to any one of [1] to [3] above, in which the cathode lead has a side end portion facing the injection port, which is processed into a shape that extends diagonally from a front surface to a rear surface or from a rear surface to a front surface in the direction of the injection port side.

[5] The method of manufacturing a solid electrolytic capacitor chip according to [4] above, in which a length (a) of the diagonally-processed side end portion of the cathode lead in a direction to the injection port, a length (b) of the cathode lead in a direction from a rear surface plane of the cathode lead to the rear surface thereof, and a thickness (D) of the cathode lead satisfy Expressions (1) and (2):

[Math. 1]

$$D/100 \leq a \leq 100D/100 \quad (1)$$

$$-150D/100 \leq b \leq 50D/100 \quad (2)$$

(in Expression (2), the symbol "−" indicates that a tip end of the side end portion of the cathode lead is positioned closer to the front surface side of the cathode lead).

[6] The method of manufacturing a solid electrolytic capacitor chip according to any one of [3] to [5] above, in which the opening of the injection port is positioned so that the opening has a larger portion on the rear surface side of the lead frame than on the front surface side of the lead frame with respect to a normal direction of the injection port.

[7] The method of manufacturing a solid electrolytic capacitor chip according to any one of [1] to [6] above, in which a plurality of the solid electrolytic capacitor elements are mounted on one cathode lead so as to be aligned in parallel in a horizontal direction.

Advantageous Effects of Invention

The present invention provides the method of manufacturing a solid electrolytic capacitor chip, comprising mounting the solid electrolytic capacitor element on one surface (herein referred to as "front surface") side of the cathode lead of the lead frame serving as the cathode terminal; electrically connecting the anode and the cathode of the solid electrolytic capacitor element respectively to the anode terminal and the cathode terminal of the lead frame; and injecting the exterior resin from the resin injection port of the mold by transfer molding to thereby seal the solid electrolytic capacitor element with the exterior resin, in which the resin injection port is located at such a position that the exterior resin injected from the injection port branches and flows toward both the front surface side and the other surface (herein referred to as "rear surface") side of the lead frame.

According to the present invention, even in the case where the resin injection port of the mold is formed at such a position that the exterior resin is brought into contact with the capacitor element, the solid electrolytic capacitor in which pin holes are less likely to be formed can be manufactured. Further, in the case where a plurality of the capacitor elements are mounted on one cathode lead so as to be aligned in parallel in the horizontal direction, the positions of the capacitor elements are less likely to be disturbed during molding, which makes it easy to keep the capacitor elements in a horizontal position to each other.

BRIEF DESCRIPTION OF THE DRAWINGS

FIG. 1 is a perspective view schematically illustrating an inside state in which one solid electrolytic capacitor element (1) mounted on a lead frame is placed in a mold and sealed with resin, and illustrating a resin injection port (5) of the mold together with an opening width (W) and an opening height (H). The thickness of the lead frame and the size of the injection port of the mold are emphasized.

FIG. 2(A) is a top view of the solid electrolytic capacitor sealed with the resin; FIG. 2(B) is a side view thereof; FIG. 2(C) is a side view taken along the line A-A of the top view FIG. 2(A); and FIG. 2(D) is a vertical sectional view taken along the line X-X of the top view FIG. 2(A).

FIG. 3(A) is a transverse sectional view taken along the line Y-Y of the top view FIG. 2(A), including a cross section of the resin injection port (5) of the mold, and FIG. 3(B) is an enlarged view illustrating a processed shape of a side end portion of a cathode lead.

FIG. 4 is an enlarged schematic view of a transverse cross section illustrating the vicinity of the injection port of the mold in the transverse cross section taken along the line Y-Y of FIG. 2 and illustrating a flow of the resin during injection of the resin.

FIG. 5(A) is a photograph showing a front surface of a solid electrolytic capacitor (conforming product) manufactured in Example 1, and FIG. 5(B) is a photograph showing a side surface thereof.

MODE FOR CARRYING OUT THE INVENTION

A method of manufacturing a solid electrolytic capacitor of the present invention is described by way of an example illustrated in the attached drawings. FIG. 1 illustrates a state in which a solid electrolytic capacitor element (1) mounted on a front surface of a lead frame (3) is placed in a mold (not shown) and sealed with resin.

In the present invention, for example, a plurality of solid electrolytic capacitor elements (1) each comprising a dielectric layer, a semiconductor layer, and a cathode layer formed sequentially on a sintered body having an anode lead wire (2) are aligned in parallel in a horizontal direction and parts of which are connected to predetermined portions of a lead frame to serve as final cathode and anode terminals. That is, the anode lead wire is mounted on an anode lead rising portion (3c) at a tip end of an anode lead (3a), and an outermost layer (cathode layer) of the capacitor element is mounted on a front surface of a cathode lead (3b). The anode lead wire is joined (electrically and mechanically connected) to the anode lead rising portion (3c) by welding, and the outermost layer (cathode layer) of the capacitor element is joined to the front surface of the cathode lead (3b) by solidification of a silver paste.

A bottom surface of the anode lead (3a) serving as the anode terminal, which has the anode lead wire mounted thereon, and a right-side bottom surface of the cathode lead (3b) serving as the cathode terminal, which has the cathode layer mounted thereon, are exposed to an outside of the mold without being sealed with the resin.

A resin injection port (5) of the mold is located on a lower side of a side surface of the mold (FIG. 3) and faces a cathode lead processed portion (3d), which is processed so as to have a smaller thickness, of the cathode lead (3b). The resin injection port (5) has a height (H) larger than a thickness (D) of the lead frame facing the resin injection port (5) and a width (W) smaller than a length of the cathode lead covered with the resin.

FIG. 2(A) is a top view of the solid electrolytic capacitor sealed with the resin, FIG. 2(B) is a side view thereof, FIG. 2(C) is a side view taken along the line A-A of the top view FIG. 2(A), and FIG. 2(D) is a vertical sectional view taken along the line X-X of the top view FIG. 2(A). It is understood from the vertical sectional view of FIG. 2(D) taken along the line X-X of the center of the capacitor and the side view of FIG. 2(C) taken along the line A-A including the resin injection port that the resin injection port (5) is formed at a position facing a side end portion of the cathode lead processed portion (3d).

FIG. 3(A) is a transverse sectional view taken along the line Y-Y of FIG. 2, and FIG. 3(B) is an enlarged view illustrating a processed shape of the side end portion of the cathode lead.

FIG. 4 is an enlarged schematic view of a transverse cross section illustrating the vicinity of the injection port of the mold in the transverse cross section taken along the line Y-Y of FIG. 2 and illustrating the resin flow during injection of the resin. The injection port (5) is formed at such a position that an exterior resin flows toward both of a rear surface side and a front surface side of the cathode lead processed portion (3d) from an injection port surface perpendicular to a horizontal surface of the lead frame as indicated by the arrows.

As described above, in the case of using the mold in which the injection port (5) is formed so as to face a side end portion (3e) of the cathode lead processed portion (3d) having the capacitor element mounted thereon, the resin injected from the injection port is brought into contact with the cathode lead (3d). Then, a part of the resin flows toward the rear surface side of the lead frame and another part of the resin flows toward the front surface side of the lead frame, with the lead frame serving as a border. As a result, the vertical movement of the plane of the lead frame is reduced as much as possible, and the capacitor element mounted on the lead frame is less likely to be fluctuated. Thus, the horizontal state of the plurality of capacitor elements can be kept easily, and pin holes, which are formed in an exterior body due to horizontal abnormality, are less likely to appear. The thickness of the resin on the front surface of the lead frame is larger than that on the rear surface of the lead frame, and hence the exterior resin is less likely to flow toward the rear surface side of the lead frame. Therefore, it is preferred that an opening of the injection port be positioned so that, with respect to a normal direction of the injection port, the opening includes the thickness direction of the lead frame and has a larger portion on the rear surface side of the lead frame than on the front surface side of the lead frame.

Further, in the present invention, it is preferred to use a frame having such a shape as illustrated in FIG. 3(B), for example, that the side end portion of the cathode lead portion facing the injection port is processed into a shape which extends diagonally from an upper surface end to a lower surface end (in the direction from a front surface to a rear surface) toward the injection port side, and it is preferred that a length (a) of the diagonally-processed side end portion of the cathode lead portion in a direction to the injection port, a vertical length (b) of the cathode lead portion in a direction from a rear surface plane of the cathode lead portion to the rear surface thereof, and a thickness (D) of the cathode lead portion satisfy Expressions (1) and (2):

[Math. 2]

$$D/100 \leq a \leq 100D/100 \tag{1}$$

$$-150D/100 \leq b \leq 50D/100 \tag{2}$$

(in Expression (2), the symbol "−" indicates that a tip end of the side end portion of the cathode lead portion is positioned closer to the front surface side of the cathode lead portion). With this, the resin flowing toward the rear surface side and the front surface side of the lead frame is appropriately distributed. As a result, the number of pin holes in the manufactured solid electrolytic capacitor is reduced, and the horizontal state of the inner elements can be kept. In the case where the tip end portion (side end portion) of the lead frame is processed as described above, when the resin flowing from the injection port is brought into contact with the side end portion of the lead frame, the resin is prevented from causing an uncontrollable turbulent flow on the periphery of the side end portion that disturbs the normal flow of the resin flowing toward the rear surface side and the front surface side of the lead frame, and thus the horizontal abnormality of the inner elements caused by such disturbance can be prevented.

The above-mentioned processing can be performed by, for example, cutting a plate material into a frame dimension from above the frame under pressure or subjecting a tip end of a frame to router processing.

EXAMPLES

Hereinafter, specific examples of the present invention are described in more details. However, the present invention is by no means limited thereto.

Examples 1 to 3 and Comparative Examples 1 to 5

(1) Manufacturing of Capacitor Element

A dielectric layer comprising niobium oxide, a semiconductor layer comprising a conductive polymer (polyethylene dioxythiophene doped with anthraquinone sulfonic acid), and a conductive layer having a carbon paste and a silver paste laminated sequentially thereon were formed in the stated order on a sintered body produced from partially nitrided niobium powder by an ordinary method, and thus a plurality of solid electrolytic capacitor elements each having dimensions of 1.62×1.02×4.08 mm were manufactured. A niobium wire having a diameter of 0.29 mm was planted on a surface of 1.62×1.02 mm.

(2) Production of Lead Frame

A copper alloy frame having a front surface plated with tin and having a thickness of 100 μm, a width of 25.0 mm, and a length of 131.0 mm was separately prepared. In this lead frame, an anode lead portion and a cathode lead portion are located perpendicularly to a frame width direction so as to face each other with a gap of 0.70 mm interposed therebetween, and 32 pairs of the anode lead portion and the cathode lead portion each having a width of 3.5 mm, that is, a total of 64 lead portions are provided.

As illustrated in FIG. 1, a tip end of an anode lead (3a) is processed so as to rise at 90° with a length of 0.65 mm on the front surface side (anode lead rising portion (3c)). A cathode lead (3b) facing the anode lead rising portion (3c) has a lower surface, which is cut by a thickness of 50 μm so as to be thin over a partial region of 4.0 mm from a tip end of the cathode lead (3b) (cathode lead processed portion (3d)).

Further, as illustrated in FIG. 3(B), a side end portion (3e) of the cathode lead processed portion is processed into a shape which extends diagonally from a front surface to a rear surface or from a rear surface to a front surface in a direction perpendicularly to an anode lead wire of the capacitor element toward an injection port side. The side end portion of the cathode lead processed portion (3d) has a length (a) of 30 μm in a direction to the injection port, and a length (b) of 5 μm in a direction to the rear surface of the cathode lead processed portion (3d).

An anode lead wire cut so as to have a length of 1.5 mm from the surface of 1.62×1.02 mm of the solid electrolytic capacitor element was located on the anode lead rising portion (3c), and a surface of 1.62×4.08 mm (cathode layer surface) of the solid electrolytic capacitor element was located on a front surface of the cathode lead processed portion (3d). Thus, three solid electrolytic capacitor elements were located on each cathode lead processed portion of the frame so as to align the surface of 1.62×4.08 mm of each element in parallel to each other in a horizontal direction. Each anode lead wire was electrically and mechanically connected to the anode lead rising portion by low-pressure resistance welding, and the cathode layer surface was electrically and mechanically connected to the cathode lead processed portion by solidification of a silver paste.

A total of 96 solid electrolytic capacitor elements are connected onto one lead frame so that three solid electrolytic capacitor elements are located on each of 32 pairs of the cathode lead and the anode lead.

Then, the frame was mounted on a mold and subjected to transfer molding with an epoxy resin by an ordinary method. In this case, a solid electrolytic capacitor was manufactured by preparing each mold as follows: the dimensions (W×H) of the injection port of the resin were set to 1.30×0.13 mm (Example 1), 1.30×0.15 mm (Example 2), 1.30×0.18 mm (Example 3), and 1.30×0.10 mm (Comparative Example 1); the center position of the injection port in each Example was set to 2.0 mm from a tip end of the cathode lead on the anode lead side; and a lower end of the mold was adjusted so that a lower end of the injection port was located at a lower end of a side surface of an exterior resin.

Further, in each of Comparative Examples 2 to 4, a solid electrolytic capacitor was manufactured by preparing a mold in which the injection port had the same dimensions as those of each of Examples 1 to 3, and the center position of the injection port was set to 4.65 mm from the tip end of the cathode lead on the anode lead side. Further, in Comparative Example 5, a solid electrolytic capacitor was manufactured by designing a mold so that the injection port had the same dimensions as those of Example 1, the center position of the injection port was set in the same way as in Example 1, and a lower end of the injection port was located at a position of 0.1 mm above from a lower end of the side surface of the exterior resin.

Note that, the capacitor after being sealed with the resin has dimensions of 4.3×1.9×7.3 mm, each terminal located on a lower surface of the exterior resin has a length (distance from an end of the exterior resin) of 1.3 mm in a direction parallel to a longitudinal direction of the capacitor, and the longitudinal direction of the injection port in each Example is parallel to the longitudinal direction of the manufactured solid electrolytic capacitor.

128 solid electrolytic capacitors manufactured in each Example were observed for the number of pin holes with naked eyes and a microscope of 20 diameters magnifying power. Table 1 shows the number (total value for 1,280 solid electrolytic capacitors (128 pieces×10 (number of experiments)) subjected to total inspection). Further, an inside of each solid electrolytic capacitor was observed with an X-ray so as to check the horizontal state of three elements. The horizontal state was evaluated as follows. 20 capacitors (corresponding to 60 capacitor elements) were selected at random, and the number of the capacitor elements that did not keep the horizontal state was summed up for 20 capacitors. The solid electrolytic capacitors having the thus obtained number of 15 or more were determined to be non-conforming.

FIGS. 5(A) and 5(B) are photographs showing an upper surface and a side surface of the solid electrolytic capacitor manufactured in Example 1, respectively. The solid electrolytic capacitors (conforming products) manufactured in the other examples had similar surfaces.

Further, the experiments were conducted 10 times in total in each of Examples 1 to 3 and Comparative Examples 1 to 5. However, both the number of pin holes in the manufactured solid electrolytic capacitors and the horizontal state of the inner elements were substantially the same as in the results of Table 1.

Example 4

A solid electrolytic capacitor was manufactured in the same way as in Example 1 except that the side end portion of the cathode lead was not processed (a=0, b=0 in FIG. 3) in Example 1. In 8 experiments out of a total of 10 experiments, the same results as those of Example 1 were obtained. However, in the remaining 2 experiments, 6 and 13 pin holes were observed with the naked eyes, 13 and 29 pin holes were observed with a microscope, and the number of horizontal defects was 5 and 11. Table 1 shows those results together.

TABLE 1

| | Number of pin holes observed with naked eyes (number) | Number of pin holes observed with microscope (number) | Horizontal state of element through X-ray |
|---|---|---|---|
| Example 1 | 0 | 0 | Conforming |
| Example 2 | 0 | 5 | Conforming |

TABLE 1-continued

| | Number of pin holes observed with naked eyes (number) | Number of pin holes observed with microscope (number) | Horizontal state of element through X-ray |
|---|---|---|---|
| Example 3 | 0 | 9 | Conforming |
| Example 4 | 19 | 42 | Partially non-conforming |
| Comparative Example 1 | 28 | 42 | Non-conforming |
| Comparative Example 2 | 19 | 56 | Non-conforming |
| Comparative Example 3 | 25 | 85 | Non-conforming |
| Comparative Example 4 | 28 | 102 | Non-conforming |
| Comparative Example 5 | 54 | 126 | Non-conforming |

INDUSTRIAL APPLICABILITY

According to the present invention, even in the case where a resin injection port of a mold is formed at such a position that an exterior resin is brought into contact with a capacitor element when the capacitor element is sealed with the exterior resin by transfer molding, the positions of a plurality of capacitor elements can be kept horizontal during molding, and a solid electrolytic capacitor in which minute holes not filled with resin are not formed in a resin exterior body can be manufactured efficiently.

REFERENCE SIGNS LIST 1 capacitor element
2 anode lead wire
3a anode lead
3b cathode lead
3c anode lead rising portion
3d cathode lead processed portion
3e side end portion of cathode lead processed portion
4 exterior resin
5 resin injection port
D thickness of a portion of the lead frame facing the resin injection port
a length of a diagonally-processed side end portion of the cathode lead in direction to the resin injection port
b length of a diagonally-processed side end portion of the cathode lead in direction from a rear surface plane of the cathode lead to a rear surface thereof.

The invention claimed is:

1. A method of manufacturing a solid electrolytic capacitor chip, comprising
mounting a solid electrolytic capacitor element on one surface (front surface) side of a cathode lead of a lead frame serving as a cathode terminal;
electrically connecting an anode and a cathode of the solid electrolytic capacitor element respectively to an anode terminal and the cathode terminal of the lead frame; and
injecting an exterior resin from a resin injection port of a mold by transfer molding so as to seal the solid electrolytic capacitor element with the exterior resin, in which the resin injection port is located at such a position that the exterior resin injected from the injection port branches and flows toward both the front surface side and the other surface (rear surface) side and of the lead frame,
wherein the height and location of the injection port is adjusted so that an upper end of the injection port is located higher than a front surface of the lead on which a sintered body is placed, and that a lower end of the injection port is located lower than a rear surface of the lead.

2. The method of manufacturing a solid electrolytic capacitor chip according to claim 1, in which the cathode lead comprises a portion that is exposed to the outside of a rear surface of the solid electrolytic capacitor chip so as to serve as a cathode when being sealed and a portion that is not exposed to the outside of the rear surface of the solid electrolytic capacitor chip when being sealed by being processed so as to have a smaller thickness by eliminating a part of a rear surface of the cathode lead in a direction from a tip end on the anode terminal side toward the cathode terminal.

3. The method of manufacturing a solid electrolytic capacitor chip according to claim 1, in which the injection port is located at a position facing the cathode lead, and an opening of the injection port has a height larger than a thickness of a side end portion of the cathode lead facing the injection port.

4. The method of manufacturing a solid electrolytic capacitor chip according to claim 1, in which the cathode lead has a side end portion facing the injection port, which is processed into a shape that extends diagonally from a front surface to a rear surface or from a rear surface to a front surface in the direction of the injection port side.

5. The method of manufacturing a solid electrolytic capacitor chip according to claim 4, in which a length (a) of the diagonally-processed side end portion of the cathode lead in a direction to the injection port, a length (b) of the cathode lead in a direction from a rear surface plane of the cathode lead to the rear surface thereof, and a thickness (D) of the cathode lead satisfy Expressions (1) and (2):

$$D/100 \leq a \leq 100D/100 \tag{1}$$

$$-150D/100 \leq b \leq 50D/100 \tag{2}$$

wherein, in (Expression (2), the symbol "−" indicates that a tip end of the side end portion of the cathode lead is positioned closer to the front surface side of the cathode) lead.

6. The method of manufacturing a solid electrolytic capacitor chip according to claim 3, in which the opening of the injection port is positioned so that the opening has a larger portion on the rear surface side of the lead frame than on the front surface side of the lead frame with respect to a normal direction of the injection port.

7. The method of manufacturing a solid electrolytic capacitor chip according to claim 1, in which a plurality of the solid electrolytic capacitor elements are mounted on one cathode lead so as to be aligned in parallel in a horizontal direction.

* * * * *